US011731536B2

(12) United States Patent
Hwang et al.

(10) Patent No.: US 11,731,536 B2
(45) Date of Patent: Aug. 22, 2023

(54) LOCKING APPARATUS OF SEAT RAIL FOR VEHICLE (71) Applicant: HYUNDAI TRANSYS INCORPORATED, Seosan-si (KR)

(72) Inventors: Seong Jun Hwang, Hwaseong-si (KR); Cheon Kim, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 17/698,103

(22) Filed: Mar. 18, 2022

(65) Prior Publication Data
US 2022/0314841 A1 Oct. 6, 2022

(30) Foreign Application Priority Data

Mar. 31, 2021 (KR) .......................... 10-2021-0042134

(51) Int. Cl.
*B60N 2/08* (2006.01)
*B60N 2/07* (2006.01)

(52) U.S. Cl.
CPC .......... *B60N 2/0825* (2013.01); *B60N 2/0705* (2013.01); *B60Y 2304/07* (2013.01)

(58) Field of Classification Search
CPC ...... B60N 2/0825; B60N 2/0705; B60N 2/00; B60N 2/07; B60N 2/08; B60Y 2304/07
USPC ........................................................ 248/429
See application file for complete search history.

(56) References Cited

U.S. PATENT DOCUMENTS

| 8,215,602 | B2 * | 7/2012 | Walter | B60N 2/0818 |
| | | | | 296/65.13 |
| 10,363,839 | B2 * | 7/2019 | Fukuda | B60N 2/08 |
| 2014/0263920 | A1 | 9/2014 | Anticuar et al. | |
| 2016/0039314 | A1 * | 2/2016 | Anticuar | B60N 2/0715 |
| | | | | 248/429 |
| 2017/0305305 | A1 * | 10/2017 | Flick | B60N 2/0818 |
| 2021/0347282 | A1 * | 11/2021 | Bozintan | B60N 2/0875 |

FOREIGN PATENT DOCUMENTS

| CN | 107107785 A | 8/2017 |
| DE | 10 2008 052 867 A1 | 11/2009 |
| DE | 10 2008 056 683 A1 | 5/2010 |
| KR | 20-2010-0012459 U | 12/2010 |
| KR | 101221652 B1 | 1/2013 |
| KR | 10-2013-0092176 A | 8/2013 |
| KR | 101330025 B1 | 11/2013 |
| KR | 10-2015-0077702 A | 7/2015 |
| KR | 10-1851601 B1 | 4/2018 |

* cited by examiner

*Primary Examiner* — Anita M King
(74) *Attorney, Agent, or Firm* — NKL Law; Jae Youn Kim (57) ABSTRACT A locking apparatus for a seat rail for a vehicle, in which a spring is compressed and fastened when first and second parts are coupled to an upper rail, such that convenience of assembly is improved, and structures for fixing the spring are respectively provided on the first and second parts, such that the structures for fixing the spring are simplified.

11 Claims, 8 Drawing Sheets

LOCKING APPARATUS OF SEAT RAIL FOR VEHICLE

CROSS REFERENCE TO RELATED APPLICATION

The present application claims priority to Korean Patent Application No. 10-2021-0042134, filed Mar. 31, 2021, the entire contents of which is incorporated herein for all purposes by this reference.

BACKGROUND OF THE INVENTION

Field of the Invention

The present invention relates to a locking apparatus for a seat rail for a vehicle, which fixes a position of an upper rail relative to a lower rail while providing the convenience of assembly thereof.

Description of the Related Art

In general, a vehicle is equipped with seats in which occupants are seated. The seat is configured to move while being slid by a seat rail in a forward/rearward direction of a vehicle body. The seat rail includes a lower rail installed on a floor panel of the vehicle and extending in the forward/rearward direction, an upper rail configured to slide in the forward/rearward direction along the lower rail, and a locking apparatus configured to restrict a free sliding movement of the upper rail relative to the lower rail.

In this case, the locking apparatus is configured such that a fork unit coupled to the upper rail so as to be rotatable by a towel bar and having a plurality of forks integrally provided at an end thereof is inserted into a plurality of fixing holes formed in a lower rail to restrict a movement of the upper rail.

The locking apparatus has a spring configured to restore the fork unit to an original position after the fork unit is rotated by the towel bar. For this reason, the locking apparatus needs to have a structure for fixing the spring. However, because the locking apparatus in the related art needs to additionally have a separate component to fix the spring, there is a problem in that the number of components increases. In addition, because the locking apparatus has a structure that needs to fasten the spring while compressing the spring, it is necessary to improve assembly properties.

The above-mentioned matters described as the background art are provided merely to aid understanding of the background of the present invention, and should not be construed to admit that the matters correspond to the technologies already known to those skilled in the art.

SUMMARY OF THE INVENTION

The present invention is proposed to solve these problems and aims to provide a locking apparatus for a seat rail for a vehicle, which has a simplified structure for fixing a spring and provides improved convenience of assembly.

An exemplary embodiment of the present invention provides a locking apparatus for a seat rail for a vehicle, the locking apparatus including: a first part provided on an upper rail so as to be movable in an upward/downward direction and formed to be caught by a lower rail depending on upper and lower positions, the first part having a center pin extending upward and a plurality of first catching portions formed around the center pin; a second part installed on the upper rail and configured to be penetrated by the center pin, the second part having a plurality of second catching portions formed around a portion of the second part penetrated by the center pin; and an elastic body disposed between the first part and the second part having one end connected to the plurality of first catching portions and another end connected to the plurality of second catching portions, the elastic body being configured to provide an elastic restoring force to the first and second parts.

A plurality of catching protrusions configured to be inserted into stopper grooves repeatedly formed in the lower rail in a longitudinal direction may be formed on the first part.

Each of the first catching portions of the first part may extend outward from the first part.

The first catching portion may be made by cutting a part of the first part and bending the part of the first part, such that the first catching portion is formed to be oblique outward.

The second part may include: a support end configured to come into contact with an upper end of the upper rail and be penetrated by the center pin; and an insertion end extending downward from the support end, formed to be matched with an installation hole of the upper rail, and configured to be inserted into the installation hole, the insertion end having the second catching portions formed therein.

The second part may have an extension end extending downward from the support end toward an inside of the insertion end, a through-hole may be formed in the extension end, the center pin may penetrate the through-hole, and a chamfer may be formed on a lower portion of the through-hole.

A support portion may be formed on an outer surface of the insertion end and spaced apart downward from the support end, the support portion may protrude laterally, and the support portion may be inclined downward from above to below.

The second catching portion may extend inward from an inner surface of the insertion end, and an end of the second catching portion may be bent upward.

The support end may have an opening hole opened toward the second catching portion, and the second catching portion and the elastic body may be exposed through the opening hole.

The elastic body may be configured as a spring, and an outer periphery of the elastic body may have a quadrangular shape.

A width of one end of the elastic body and a width of the other end of the elastic body may be larger than a width of a central portion of the elastic body.

According to the locking apparatus for a seat rail for a vehicle which is structured as described above, since the spring is compressed and fastened when the first and second parts are coupled to the upper rail, the convenience of assembly is improved. Further, since the structures for fixing the spring are respectively provided on the first and second parts, the structures for fixing the spring are simplified.

DETAILED DESCRIPTION OF THE INVENTION

Hereinafter, a locking apparatus for a seat rail for a vehicle according to an exemplary embodiment of the present invention will be described with reference to the accompanying drawings.

Figure 1:
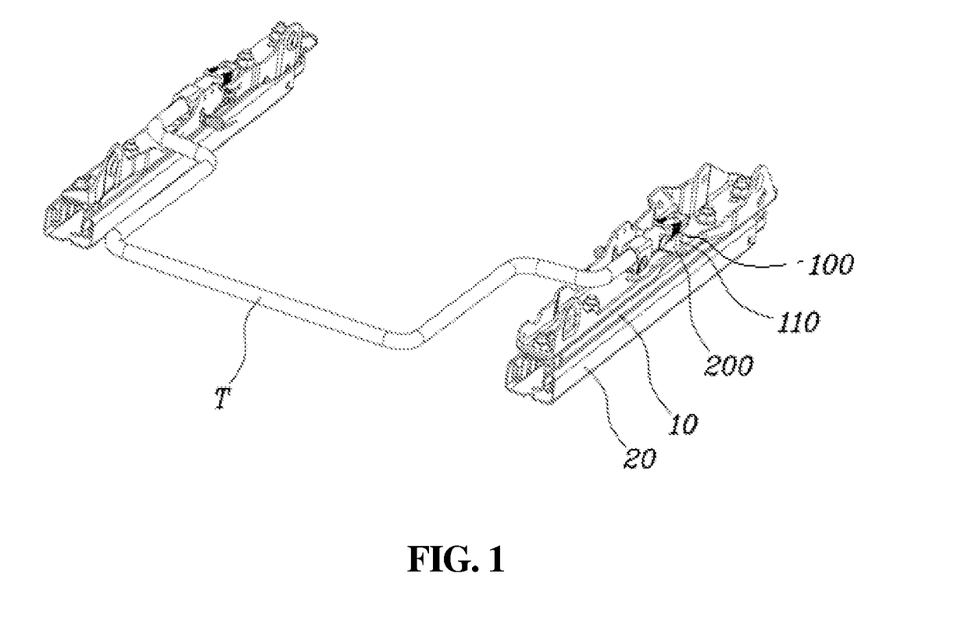
FIG. 1 is a view illustrating a seat rail according to the present invention.
Figure 2:
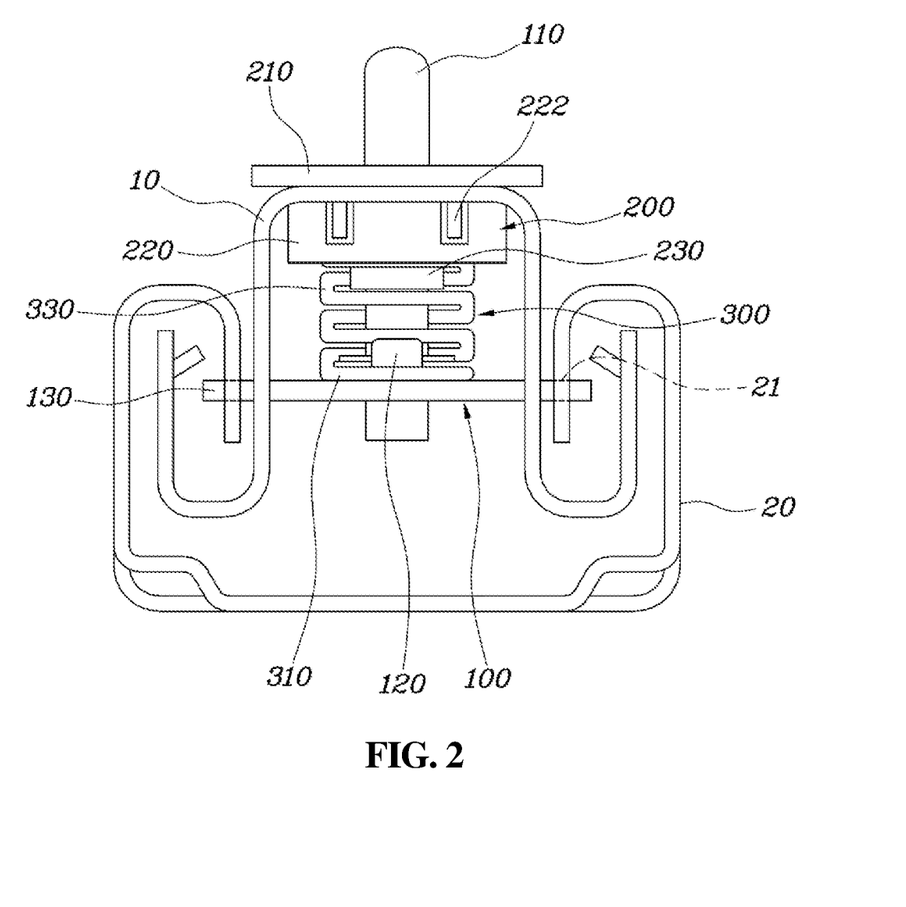
FIG. 2 is a cross-sectional view illustrating a state before a locking apparatus for a seat rail for a vehicle illustrated in FIG. 1 operates.
Figure 3:
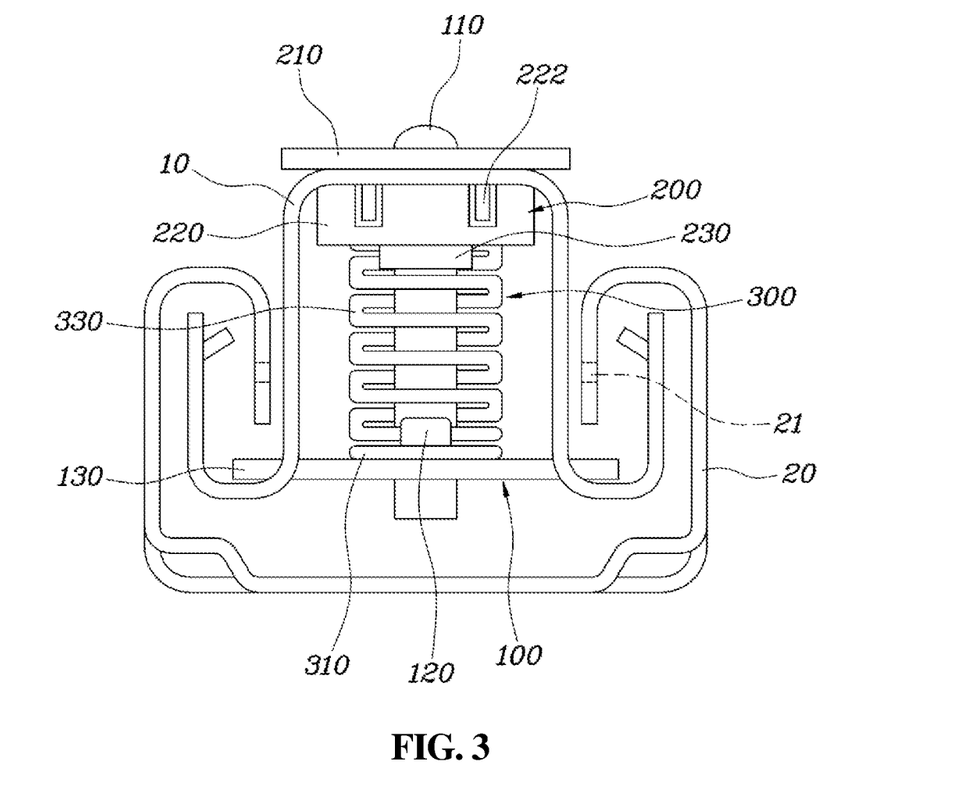
FIG. 3 is a cross-sectional view illustrating a state after the locking apparatus for a seat rail for a vehicle illustrated in FIG. 1 operates.
Figure 4:
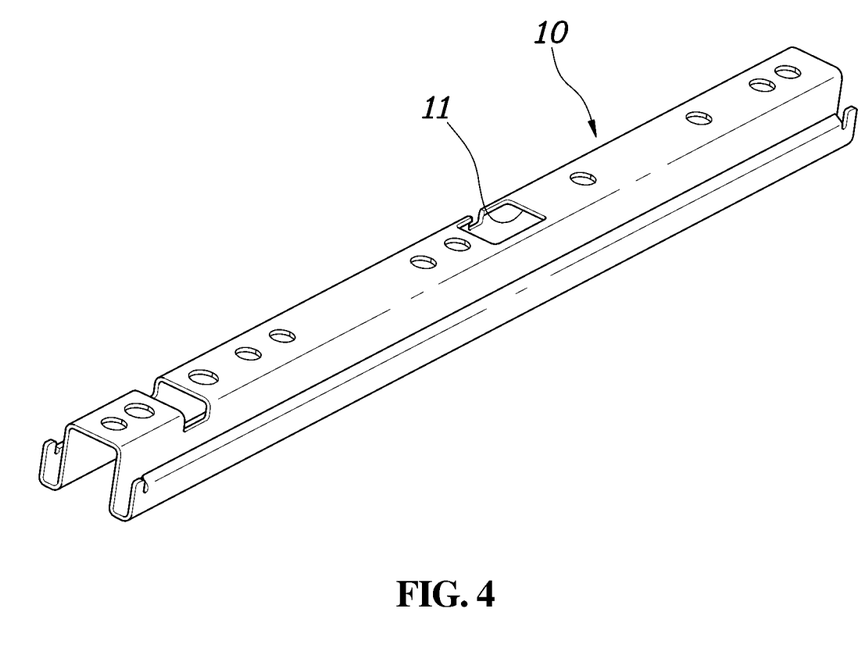
FIG. 4 is a view illustrating an upper rail according to the present invention.
Figure 5:
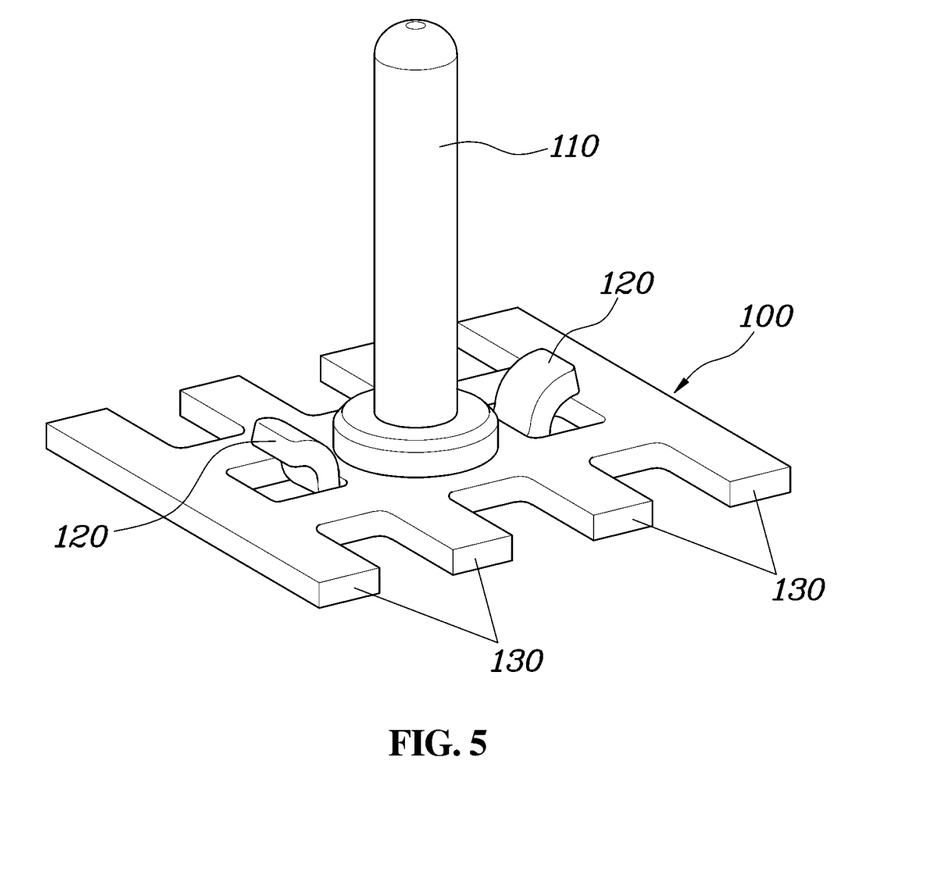
FIG. 5 is a view illustrating a first part according to the present invention.
Figure 6:
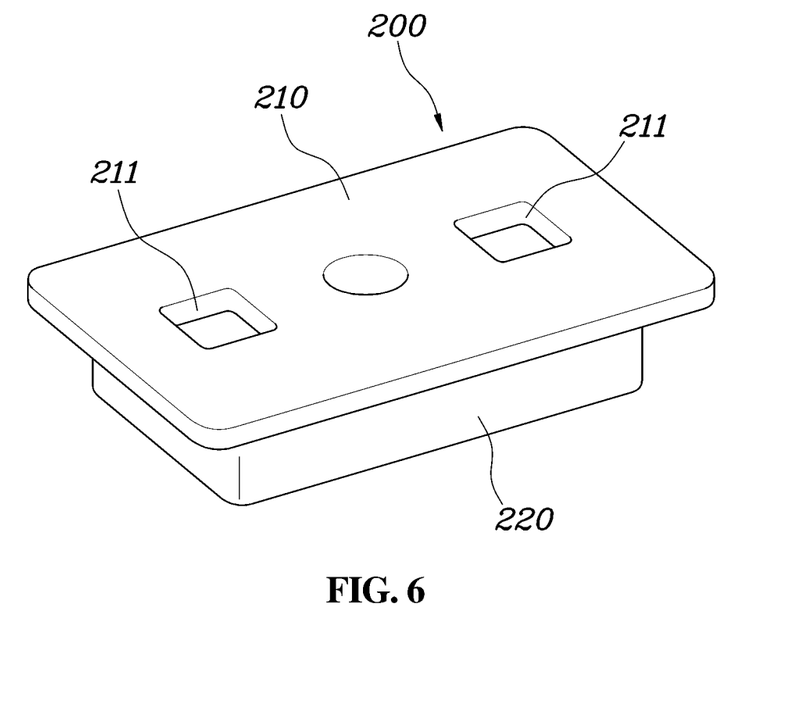
FIG. 6 is a view illustrating a second part according to the present invention.
Figure 7:
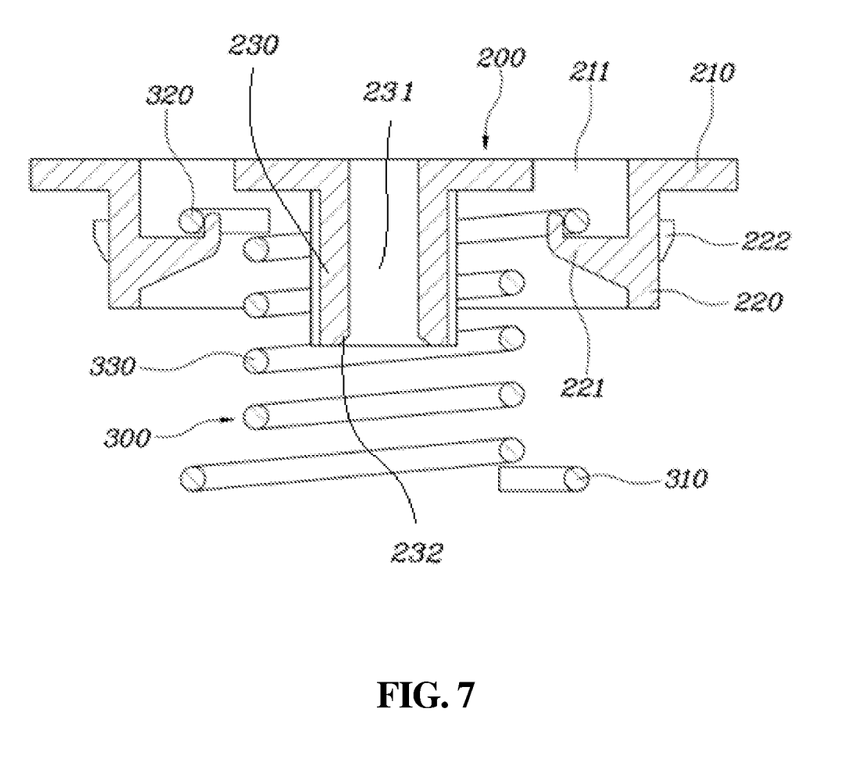
FIG. 7 is a cross-sectional view illustrating a state in which the first part, the second part, and an elastic body are assembled.
Figure 8:
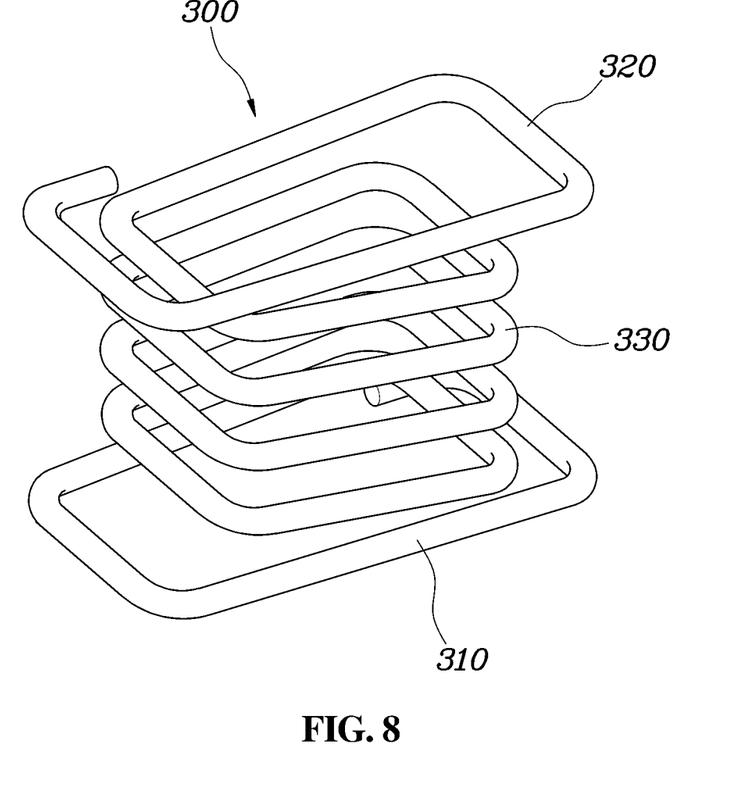
FIG. 8 is a view illustrating the elastic body according to the present invention.

FIG. 1 is a view illustrating a seat rail according to the present invention, FIG. 2 is a cross-sectional view illustrating a state before a locking apparatus for a seat rail for a vehicle illustrated in FIG. 1 operates, FIG. 3 is a cross-sectional view illustrating a state after the locking apparatus for a seat rail for a vehicle illustrated in FIG. 1 operates, FIG. 4 is a view illustrating an upper rail according to the present invention, FIG. 5 is a view illustrating a first part according to the present invention, FIG. 6 is a view illustrating a second part according to the present invention, FIG. 7 is a cross-sectional view illustrating a state in which the first part, the second part, and an elastic body are assembled, and FIG. 8 is a view illustrating the elastic body according to the present invention.

The locking apparatus for a seat rail for a vehicle according to the present invention is illustrated in FIGS. 1 to 8.

According to the present invention, upper rails 10 are slidably installed on lower rails 20, and first parts 100 are moved depending on an operating position of a towel bar T installed on sides of the upper rails 10, such that the first parts 100 are locked to or unlocked from the lower rails 20. The first part 100 may be restored to an original position by a second part 200 and an elastic body 300.

That is, the locking apparatus according to the present invention includes: the first parts 100 provided on the upper rails 10 so as to be movable in an upward/downward direction and formed to be caught by the lower rails 20 depending on upper and lower positions of the first parts 100, the first parts 100 each having a center pin 110 extending upward and a plurality of first catching portions 120 formed around of the center pin 110; second parts 200 installed on the upper rails 10 and each configured to be penetrated by the center pin 110, the second parts 200 each having a plurality of second catching portions 221 formed around a portion penetrated by the center pin 110; and elastic bodies 300 each disposed between the first part 100 and the second part 200 and each having one end 310 connected to the first catching portions 120 and the other end 320 connected to the second catching portions 221, the elastic bodies 300 being configured to provide an elastic restoring force to the first and second parts 100 and 200.

As described above, the locking apparatus according to the present invention includes first parts 100, second parts 200, and elastic bodies 300. The locking or unlocking operation may be performed as the second parts 200 are supported on the upper rails 10 and the first parts 100 connected to the towel bar T are moved in the upward/downward direction. In this case, the first part 100 is restored to the original position by the elastic body 300.

In detail, the first part 100 is provided in the upper rail 10 and formed to be caught by the lower rail 20. That is, stopper grooves 21 are repeatedly formed in the lower rail 20 and disposed in a longitudinal direction of the lower rail 20, and a plurality of catching protrusions 130 configured to be inserted into the stopper grooves 21 is formed at the periphery of the first part 100. When the first part 100 moves upward, the catching protrusion 130 is inserted into the stopper groove 21, such that the locking operation is performed. When the first part 100 moves downward, the catching protrusion 130 is separated from the stopper groove 21, such that the unlocking operation is performed.

In the first part 100, the center pin 110 extends upward, and the plurality of first catching portions 120 is formed around the center pin 110. As illustrated in FIG. 1, the center pin 110 of the first part 100 is exposed to an upper side of the upper rail 10 and comes into contact with the towel bar T, such that the first part 100 may move upward or downward depending on the rotation positions of the towel bar T.

In addition, the first part 100 has the plurality of first catching portions 120 to which the elastic body 300 may be connected. The plurality of first catching portions 120 is formed on the first part 100 and disposed around the center pin 110, i.e., at the periphery of the center pin 110 so that the elastic body 300 is stably connected to the plurality of first catching portions 120.

The first catching portion 120 is made by cutting a part of the first part 100 and bending the part of the first part 100 upward, such that the first catching portion 120 is formed to be oblique outward. Since the first catching portion 120 is made by cutting the first part 100 as described above, a separate component for forming the first catching portion 120 on the first part 100 is not required. In addition, the first catching portion 120 may extend obliquely outward from the first part 100. Therefore, when a spring is applied as the elastic body 300, the elastic body 300 is fastened to the first catching portion 120 by spreading one end 310 of the elastic body 300, such that one end 310 of the elastic body 300 is easily fastened to the first part 100.

Meanwhile, the second part 200 includes a support end 210 configured to come into contact with an upper end of the upper rail 10 and be penetrated by the center pin 110, and an insertion end 220 extending downward from the support end 210, formed to be matched with an installation hole 11 of the upper rail 10, and configured to inserted into the installation hole 11, the insertion end 220 having the second catching portions 221 formed therein.

That is, the second part 200 includes the support end 210 and the insertion end 220. The support end 210 is supported on the upper end of the upper rail 10 when the insertion end 220 is inserted into the installation hole 11 of the upper rail 10. In addition, the second catching portions 221 are formed inside the insertion end 220, and the other end 320 of the elastic body 300 is fastened to the second catching portions 221. In this case, the installation hole 11 of the upper rail 10 has a quadrangular shape, and the insertion end 220 of the second part 200 has a quadrangular shape, such that a rotation of the second part 200 is prevented.

Meanwhile, the second part 200 has an extension end 230 extending downward from the support end 210 toward an inside of the insertion end 220, a through-hole 231 is formed in the extension end 230, the center pin 110 penetrates the through-hole 231, and a chamfer 232 is formed on a lower portion of the through-hole 231. That is, the center pin 110 penetrates the second part 200. Since the extension end 230 extends downward from the support end 210, the movement of the center pin 110 is guided through the through-hole 231 formed in the extension end 230. In addition, the chamfer 232 having a width, which gradually increases obliquely, is formed on the lower portion of the through-hole 231 of the extension end 230, such that the center pin 110 is easily inserted into the extension end 230 of the second part 200 when the first part 100 and the second part 200 are assembled.

Meanwhile, support portions 222 formed on an outer surface of the insertion end 220, spaced apart downward from the support end 210, and protruding laterally, and the support portions 222 are inclined downward from above to below. The support portions 222 serve to allow the second part 200 to be mounted on the upper rail 10 in cooperation with the support end 210. When the insertion end 220 of the second part 200 is inserted into the installation hole 11 of the upper rail 10, the support end 210 is supported on the upper end of the upper rail 10, and the support portions 222 are supported on a lower end of the upper rail 10, such that the mounted state may be maintained. In particular, since the support portion 222 is inclined downward from above to below, the insertion end 220 may smoothly pass through the installation hole 11 of the upper rail 10, and the upward separation of the insertion end 220 is prevented after the support portions 222 pass through the installation hole 11.

Meanwhile, the second catching portion 221 extends inward from an inner surface of the insertion end 220, and an end of the second catching portion 221 is bent upward. Since the second catching portion 221 extends from the inner surface of the insertion end 220 as described above, a separate component for forming the second catching portion 221 on the second part 200 is not required. In addition, since the end of the second catching portion 221 is bent upward, the withdrawal of the elastic body 300 is prevented when the other end 320 of the elastic body 300 is fastened to the second catching portion 221.

In addition, opening holes 211 are formed in the support end 210 and opened toward the second catching portion 221, and the second catching portion 221 and the elastic body 300 are exposed through the opening holes 211. Therefore, it is possible to check, through the opening holes 211, whether the elastic body 300 is normally fastened when the elastic body 300 is mounted on the second catching portion 221 of the second part 200. The operation of detaching the elastic body 300 may be performed through the opening holes 211 at the time of detaching the elastic body 300.

Meanwhile, the elastic body 300 is configured as a spring, and an outer periphery of the elastic body 300 has a quadrangular shape. Since the elastic body 300 has a quadrangular shape as described above, a degree of design freedom is ensured in the longitudinal direction in comparison with a general circular shape. In addition, since the elastic body 300 is fastened to the first part 100 and the second part 200, the fastening portions between the elastic body 300 and the first and second parts 100 and 200 each have a straight section that implement robust fastening performance, thereby preventing the separation of the elastic body 300.

In addition, a width of one end 310 of the elastic body 300 and a width of another end 320 of the elastic body 300 may be larger than a width of a central portion 330 of the elastic body 300. Therefore, one end 310 and the another end 320 of the elastic body 300 may be easily fastened to the first catching portion 120 of the first part 100 and the second catching portion 221 of the second part 200, respectively. Further, one end 310 and the another end 320 of the elastic body 300 may be smoothly fastened to the first catching portion 120 and the second catching portion 221, respectively, within a range in which the central portion 330 does not interfere with the center pin 110 of the first part 100 and the extension end 230 of the second part 200.

A process of assembling the locking apparatus according to the present invention will be described below.

The another end 320 of the elastic body 300 is connected and assembled to the second catching portion 221 of the second part 200, and the second part 200, to which the elastic body 300 is coupled, is mounted in the installation hole 11 of the upper rail 10. In this case, the state in which the second part 200 is fixed to the upper rail 10 is maintained by the support end 210 and the support portion 222. Thereafter, when the first part 100 is assembled to the second part 200 from below to above, the center pin 110 of the first part 100 passes through the second part 200 and is exposed to the upper side of the upper rail 10, and one end 310 of the elastic body 300 is fastened to the first catching portion 120 of the first part 100, such that the assembled state of the first and second parts 100 and 200 is maintained by means of the elastic body 300.

According to the locking apparatus for a seat rail for a vehicle which is structured as described above, since the spring is compressed and fastened when the first and second parts 100 and 200 are coupled to the upper rail 10, the convenience of assembly is improved. Further, since the structures for fixing the spring are respectively provided on the first and second parts 100 and 200, the structures for fixing the spring are simplified.

While the specific embodiments of the present invention have been illustrated and described, it will be obvious to those skilled in the art that the present invention may be variously modified and changed without departing from the technical spirit of the present invention defined in the appended claims.

What is claimed is:

1. A locking apparatus for a seat rail for a vehicle, the locking apparatus comprising:
    a first part provided on an upper rail so as to be movable in an upward/downward direction and formed to be caught by a lower rail depending on upper and lower positions, the first part having a center pin extending upward and a plurality of first catching portions formed around the center pin;
    a second part installed on the upper rail and configured to be penetrated by the center pin, the second part having a plurality of second catching portions formed around a portion of the second part penetrated by the center pin; and
    an elastic body disposed between the first part and the second part having one end connected to the plurality of first catching portions and another end connected to the plurality of second catching portions, the elastic body being configured to provide an elastic restoring force to the first and second parts.

2. The locking apparatus of claim 1, wherein the first part includes the plurality of first catching protrusions configured to be inserted into stopper grooves repeatedly formed in the lower rail in a longitudinal direction of the lower rail.

3. The locking apparatus of claim 1, wherein each of the plurality of first catching portions of the first part extends outward from the first part.

4. The locking apparatus of claim 3, wherein each of the plurality of first catching portions is made by cutting a part of the first part and bending the part of the first part, such that each of the plurality of first catching portions is formed to be oblique outward.

5. The locking apparatus of claim 1, wherein the second part comprises: a support end configured to come into contact with an upper end of the upper rail and be penetrated by the center pin; and
an insertion end extending downward from the support end, formed to be matched with an installation hole of the upper rail, and configured to be inserted into the installation hole, the insertion end having the plurality of second catching portions formed therein.

6. The locking apparatus of claim 5, wherein the second part has an extension end extending downward from the support end toward an inside of the insertion end, a through-hole is formed in the extension end, the center pin penetrates the through-hole, and a chamfer is formed on a lower portion of the through-hole.

7. The locking apparatus of claim 5, wherein a support portion is formed on an outer surface of the insertion end and spaced apart downward from the support end, the support portion protrudes laterally, and the support portion is inclined downward from above to below with respect to the support end.

8. The locking apparatus of claim 5, wherein each of the plurality of second catching portions extends inward from an inner surface of the insertion end, and an end of each of the plurality of second catching portions is bent upward.

9. The locking apparatus of claim 5, wherein the support end has an opening hole opened toward one of the plurality of second catching portions, and the one of the plurality of second catching portions and the elastic body are exposed through the opening hole.

10. The locking apparatus of claim 1, wherein the elastic body is a spring, and an outer periphery of the spring has a quadrangular shape.

11. The locking apparatus of claim 1, wherein a width of one end of the elastic body and a width of another end of the elastic body are larger than a width of a central portion of the elastic body.

* * * * *